US006950933B1

(12) United States Patent
Cook et al.

(10) Patent No.: US 6,950,933 B1
(45) Date of Patent: Sep. 27, 2005

(54) METHOD AND SYSTEM FOR MANAGEMENT AND NOTIFICATION OF ELECTRONIC CERTIFICATE CHANGES

(75) Inventors: Jeff Cook, Venice, CA (US); Michael Heyman, Columbia, MD (US); Peter Dinsmore, Ellicott City, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/574,395

(22) Filed: May 19, 2000

(51) Int. Cl.$^7$ .............................................. H04L 9/00

(52) U.S. Cl. ...................... 713/158; 713/155; 713/156; 713/157; 713/200; 705/80; 379/57

(58) Field of Search ........................... 705/80; 379/57; 380/25; 713/158

(56) References Cited

U.S. PATENT DOCUMENTS

| | | | |
|---|---|---|---|
| 5,361,002 A | | 11/1994 | Casper ........................ 327/530 |
| 5,537,533 A | * | 7/1996 | Staheli et al. .......... 395/182.03 |
| 5,561,703 A | * | 10/1996 | Arledge et al. ................ 379/57 |
| 5,666,416 A | | 9/1997 | Micali ........................ 713/158 |
| 5,687,235 A | * | 11/1997 | Perlman et al. ............... 380/25 |
| 5,699,431 A | * | 12/1997 | Van Oorschot et al. ....... 380/30 |
| 5,717,757 A | | 2/1998 | Micali ........................ 713/158 |
| 5,717,758 A | | 2/1998 | Micall ........................ 713/158 |
| 5,793,868 A | | 8/1998 | Micali ........................ 380/28 |
| 5,872,844 A | * | 2/1999 | Yacobi ........................ 705/69 |
| 5,903,651 A | | 5/1999 | Kocher ........................ 713/158 |
| 5,903,882 A | | 5/1999 | Asay et al. ................... 705/44 |
| 5,922,074 A | | 7/1999 | Richard et al. ............. 713/201 |
| 5,983,228 A | * | 11/1999 | Kobayashi et al. ........... 707/10 |

(Continued)

FOREIGN PATENT DOCUMENTS

EP 01251422 A2 * 10/2002 ............. G06F 1/00

(Continued)

OTHER PUBLICATIONS

Anthony Ralston et al., Encyclopediea of Computer Science: Modular Programming, 1995, International Thomson Computer Press, 3$^{rd}$ Edition, pp. 899.*

(Continued)

*Primary Examiner*—Ayaz Sheikh
*Assistant Examiner*—Aravind K Moorthy
(74) *Attorney, Agent, or Firm*—Zilka-Kotab, PC; Christopher J. Hamaty (57) ABSTRACT

A system for notification of a change in condition of an electronic certificate is disclosed. The system includes a certificate server comprising a processor having a computer program comprising a plurality of executable modules that are executable on the processor. A first executable module is for detecting a change in condition of an electronic certificate. A second executable module in the computer program is for notifying a user of the electronic certificate of the change in condition. The computer program may comprise a third module for negotiating a contract, called a certificate action point (CAP), with the certificate user regarding the type of change in condition the second module notifies the certificate user of, the way the second module notifies the certificate user, the diligence with which the second module notifies the certificate user of the change in condition, and a price for notifying the certificate user. The change in condition may comprise revocation of, roll-over of, change in field of, disablement of, expiration of the electronic certificate, or other type of change in condition of an electronic recognized by those skilled in the art. An updated electronic certificate may be forwarded to the certificate user, thereby updating the electronic certificate with respect to the certificate user to the new version of the electronic certificate. Alternatively, the certificate user may selectively download an updated version of the electronic certificate from the certificate server.

1 Claim, 4 Drawing Sheets

U.S. PATENT DOCUMENTS

| | | | | |
|---|---|---|---|---|
| 6,055,519 | A | * | 4/2000 | Kennedy et al. ............... 705/80 |
| 6,092,201 | A | * | 7/2000 | Turnbull et al. ............ 713/201 |
| 6,097,811 | A | * | 8/2000 | Micali ........................ 713/186 |
| 6,134,550 | A | * | 10/2000 | Van Oorschot et al. ......... 707/9 |
| 6,134,551 | A | * | 10/2000 | Aucsmith .................... 707/10 |
| 6,230,194 | B1 | * | 5/2001 | Frailong et al. ............ 709/220 |
| 6,434,536 | B1 | * | 8/2002 | Geiger ........................ 705/37 |
| 6,442,688 | B1 | * | 8/2002 | Moses et al. ................ 713/158 |
| 6,766,450 | B2 | * | 7/2004 | Micali ........................ 713/158 |
| 6,802,002 | B1 | * | 10/2004 | Corella ....................... 713/175 |

FOREIGN PATENT DOCUMENTS

| | | | | |
|---|---|---|---|---|
| WO | WO0111843 A1 | * | 2/2001 | ........... H04L 27/00 |

OTHER PUBLICATIONS

Fratto, Mike, Certificate Revocation: When Not to Trust, 2000, Network Computing, pp. 127-129.*

Firozaadi et al, Revocation Scheme for Delegated Authorities, 2002, IEEE, pp. 210-213.*

Faldella et al, A Flexible Scheme for On-Line Public-Key Certificate Status Updating and Verification, 2002, IEEE, pp. 891-898.*

Li et al, Resilient Self-Organizing Overlay Networks for Security Update Delivery, 2004, IEEE, pp. 189-202.*

Kikuchi et al, Performance Evaluation of Public-key Certificate Revocation System with Balanced Hash Tree, 1999, IEEE, pp. 204-209.*

Rogers, Amy, Certification validation gives PKI more power, 1999, Computer Reseller News, p. 147.*

Naor et al, Certificate Revocation and Certificate Update, 2000, IEEE, pp. 561-570.*

Faldella et al, A Novel Approach to On-Line Status Authentication of Public-key Certificates, 2000, IEEE, pp. 270-277.*

* cited by examiner

METHOD AND SYSTEM FOR MANAGEMENT AND NOTIFICATION OF ELECTRONIC CERTIFICATE CHANGES

BACKGROUND OF THE INVENTION

1. Field of the Invention

A system and method for management and notification of changes in condition of electronic certificates is disclosed. Specifically, a system and method for allowing electronic certificate users to contract with a server for receiving notifications of changes in conditions of electronic is disclosed.

2. Description of the Prior Art and Related Information

A public key infrastructure (PKI) enables users of a public network, such as the Internet, to securely and privately exchange data and money through the use of public and private cryptographic key pairs. The public key of the key pair may comprise all or part of a digital, or electronic, certificate. The public key infrastructure provides for electronic certificates that can identify individuals or organizations and directory services that can store and, when necessary, revoke them. Although the components of a PKI are generally understood, a number of different vendor approaches and services are emerging. Meanwhile, Internet standards for PKIs are currently being developed.

The public key infrastructure assumes the use of public key cryptography, which is the most common method on the Internet for authenticating a message sender or encrypting or decrypting a message. Traditional cryptography has usually involved the creation and sharing of a private key for the encryption and decryption of messages: This secret key system has the significant flaw that if the key is discovered or intercepted by someone else, messages can easily be decrypted. For this reason, public key cryptography and the public key infrastructure is the preferred approach on the Internet. The secret key system is sometimes known as symmetric cryptography and the public key system as asymmetric cryptography.

A public key infrastructure (PKI) may comprise a certificate server that may comprise a certificate authority (CA) that issues, verifies, signs, and/or stores electronic certificates. The certificate server may further comprise a server having an X.509 directory or a PGP key server. An electronic certificate may include the public key or information about the public key. The infrastructure may further include registration authorities (RAs) which act as verifiers for the certificate server before an electronic certificate is issued to a requester. The infrastructure may further include one or more directories where the electronic certificates, with their public keys, are stored, usually in an ITU X.500 standard directory. The electronic certificates are managed by a certificate management system.

In public key cryptography, the public key and corresponding private key are created using a cryptographic algorithm, such as the popular algorithm known as RSA, typically by the owner of the private key. The public key is then embodied in an electronic certificate that may be issued by a certificate authority, or perhaps self-issued by the owner of the private key, and then the certificate is made publicly available in a directory that all parties can access. The private key is not disclosed to outside parties. Thus, if a user of the electronic certificate wants to send a message to the holder of the private key, who is the owner of the electronic certificate, the user may find the owner's electronic certificate, but not the owner's private key, on the certificate server's directory and encrypt a message to the owner using the public key. When the owner of the electronic certificate receives the message, the owner may decrypt it with the owner's private key. In addition to encrypting messages (which ensures privacy), the user can authenticate itself to the owner by using the user's private key to sign an electronic digest. When the owner receives the message, the owner can use the user's public key to verify the message.

A number of current products enable a company or group of companies to implement a PKI. The acceleration of e-commerce and business-to-business commerce over the Internet has increased the demand for PKI solutions. Related ideas are virtual private networks (VPNs) and the IP Security (IPSec) standard. Some PKI system vendors include:

RSA Security, Inc., which has developed the main algorithms used by PKI vendors;

Verisign, which acts as a certificate authority and sells software that allows a company to create its own certificate authorities;

GTE, which provides a system called CYBERTRUST, which provides a PKI implementation methodology and consultation service;

Check Point, which offers a product, VPN-1 CERTIFICATE MANAGER, that is based on the NETSCAPE DIRECTORY SERVER;

Xcert, whose WEB SENTRY product checks the revocation status of certificates on a server, using the online certificate status protocol (OCSP);

Netscape, whose DIRECTORY SERVER product is said to support 50 million objects and process 5,000 queries a second; and whose SECURE E-COMMERCE product allows a company or extranet manager to manage electronic certificates; and whose META-DIRECTORY product can connect all corporate directories into a single directory for security management; and Entrust Technologies of Plano, Tex., which is another prominent PKI vendor.

For e-mail, the PRETTY GOOD PRIVACY (PGP) product by Network Associates, Inc. of San Jose, Calif., lets users encrypt a message to anyone who has a PGP public key. A user encrypts a message with recipient's public key and the certificate owner decrypts the message with their private key. PGP users share directories of public keys stored on PGP key servers. As another option, PGP lets the user digitally sign the message with a digital signature using the user's private key. The recipient who is the certificate's owner can then get the user's public key and verify the user's signature to see whether it was really the user who sent the message.

An electronic certificate can also be used as an electronic credit card that establishes the owner's credentials when doing business or other transactions on the Internet or other networks. It is typically issued by a certificate authority, and contains the owner's name, a serial number, expiration dates, a copy of the certificate holder's public key, and the digital signature of the certificate authority so that a recipient can verify that the certificate is real. Some electronic certificates conform to a standard known as X.509.

One of the most common problems with PKIs, and the like, is that when certificates change, it is generally up to all the users of the electronic certificate to find out that such a change occurred. Often, users are too busy to check all of the electronic certificates that they use, or do not have the resources to constantly do so. Further, if a user does decide to check if a particular electronic certificate has changed, they must search through large databases on the certificate server. An example of a change in condition of an electronic certificate is revocation of the electronic certificate, that is declaring the electronic certificate to be invalid.

Attempts have been made to solve the shortcomings of the prior art, at least with respect to revocation. For example, U.S. Pat. No. 5,687,235 discloses an electronic certificate revocation process that improves the efficiency of an authentication exchange in a public key distributed network system. Specifically, the revocation service (RS) that, in response to a unique request from a server node, selects certain revoked electronic certificates from a current certificate revocation list (CRL) to include in its reply so as to consume minimal system bandwidth is described. The unique request includes a number of parameters for consideration by the RS in generating its reply, including a maximum CRL size and/or a timestamp. The maximum CRL size indicates the largest number of revoked certificate serial numbers that the server node can process and thus receive in the revocation service reply, whereas the timestamp indicates the latest electronic certificate revocation date of the certificates included in the CRL presently retained by the server node. The RS generates an optimal CRL for its reply that contains all, part, or none of the current CRL revoked certificate serial numbers. Determination of the optimal CRL entails consideration of any number and combination of optimization factors, including the number of revoked certificates stored in the CRL storage facility and the time remaining before the current CRL is to be updated by a certificate authority (CA), the expiration date of the certificates, as well as the maximum CRL size and/or timestamp parameters provided to the RS in the server node request. The server node may control whether it will receive an optimal CRL and if so, what portion of the current CRL it will include by manipulating the parameters it provides to the RS. This enables each server node to request the CRL based upon its own specific security needs while optimizing the certificate revocation process. Further, the RS and/or server node may discard certificate serial numbers as their expiration dates come to pass.

U.S. Pat. No. 5,666,416 discloses a method of managing electronic certificates in a communication system having a certifying authority and a directory. The method begins by having the certifying authority generate electronic certificates by digitally signing a given piece of data. At a later point time, the certifying authority may produce a string that proves whether a particular electronic certificate is currently valid without also proving the validity of at least some other certificates. The technique obviates use of certification revocation lists communicated between the certifying authority and the directory.

U.S. Pat. No. 5,793,868 discloses a method for authenticating information about revoked electronic certificates that includes generating data identifying the revoked electronic certificates, generating information about the revoked electronic certificates including the data without including the revocation date of every one of the revoked electronic certificates, and having the certificate authority authenticate the information. The data may be generated by performing a hash of at least a portion of each of the electronic certificates. Generating information about the revoked electronic certificates may include adding a date indicating when the information was authenticated and may exclude the revocation date of any one of the revoked electronic certificates in the list.

None of the above mentioned systems solve the problems associated with the user of an electronic certificate having to take a proactive role in tracking and dealing with changes in conditions of electronic certificates. Further, none of the above systems provide for a notification service for changes in conditions of electronic certificates. Further, none of the above systems provide a system for collecting revenues for such a notification system.

SUMMARY OF THE INVENTION

To solve the problems cited above, the invention is a system for notification of a change in condition of an electronic certificate. Specifically, the system includes a processor having a computer program comprising a plurality of executable modules that are executable on the processor. A first executable module is for detecting a change in condition of an electronic certificate. The electronic certificate may have been uploaded by a creator of the electronic certificate for use by users of the electronic certificate. The change in the electronic certificate may be effectuated by the owner of the electronic certificate, or a third party system wherein a change signal is provided for ordering the change in the electronic certificate. A second executable module in the computer program is for notifying a user of the electronic certificate of the change in condition.

The user of the electronic certificate may comprise a certificate user. The certificate user may also comprise one or more of a plurality of users in a company who are notified when any electronic certificate in the company's domain is revoked or changed. Some or all of the users in the company may not even have received, or known of, the electronic certificate until notice of the change is provided.

The computer program may comprise a third module for negotiating a contract, called a certificate action point (CAP), with the certificate user. The contract may regard the type of change the second module notifies the certificate user of, the way the second module notifies the certificate user, the diligence with which the second module notifies the certificate user of the change in condition, and a price for notifying the certificate user. The change in condition may comprise a revocation of, roll-over of, change in field of, disablement of, or expiration of the electronic certificate. The certificate server may forward an updated electronic certificate read from the certificate server to the certificate user, thereby updating the electronic certificate with respect to the certificate user to the new version of the electronic certificate. Alternatively, the certificate server may selectively allow the certificate user to download an updated version of the electronic certificate. The frequency with which the electronic certificate is checked for changes, and notification is forwarded to the certificate user, may be anywhere from every second in time, to once a week or more, depending on the CAP that was negotiated. The length of time that the CAP is in place may further be negotiated by the third module. This length of time could be either one day or last in perpetuity, depending on the CAP negotiated.

The certificate server typically stores a plurality of electronic certificates. The electronic certificate for which the first module detects a change in condition comprises at least one of the plurality of electronic certificates. The electronic certificates may be stored in an ITU X.500 certificate directory on the certificate server, or the certificate server may comprise a certificate authority or a PGP key server. The first module may detect a change in condition of two or more electronic certificates, and the second module is for notifying one or more respective certificate users of the change in condition of the respective electronic certificate based on contract negotiated by the third module. Each of the certificate users negotiates a CAP for notification. Each CAP may apply to one or more of the electronic certificates.

In an alternative embodiment, the electronic certificate may be stored separately from the computer program. For example, the electronic certificate may be stored on a first server in a directory stored on the first server, the first server being a certificate server, and the processor on which the computer program and its executable modules are stored and executed comprises a second server, or certificate action point server (CAP server). However, preferably, the CAP server is co-resident with the certificate server as in the above described embodiment, meaning that the CAP server comprises the same server, or server cluster, as the certificate server. At least the first module is preferably co-resident on the certificate server. If the certificate server and CAP server are not co-resident, a communication channel between them connects the certificate server to the CAP server such that data communications may occur between them. The communication channel may comprise a network, wherein said certificate and CAP servers each have a network interface for data communications in said network. Each of the network interfaces may comprise a local or wide area network connection comprising an Ethernet compatible interface or Internet connection respectively.

DETAILED DESCRIPTION OF THE PREFERRED EMBODIMENTS

Figure 1:
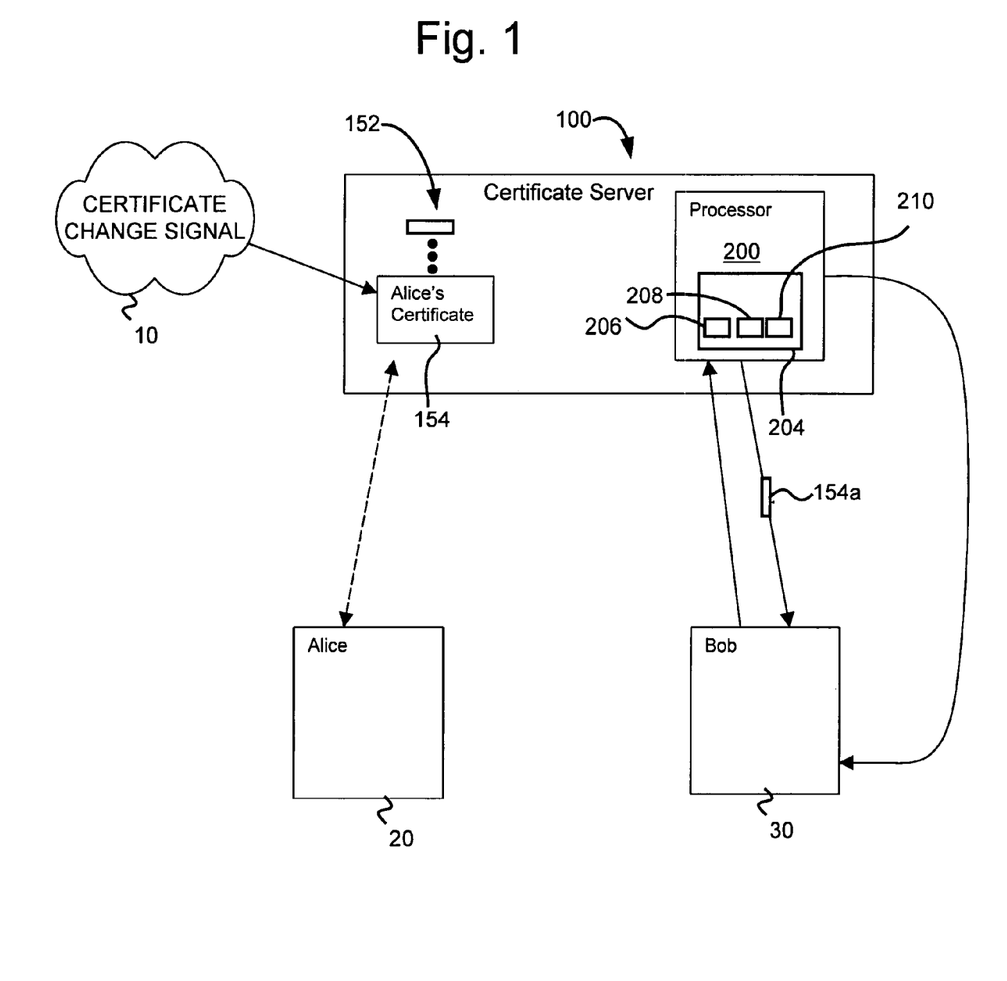
FIG. 1 is a block diagram illustrating a system architecture for present invention.

With reference to FIG. 1, a block diagram illustrating a system architecture for a system for notification of a change in condition of an electronic certificate is shown. The system includes a certificate server 100, having processor 200, the processor 200 having a computer program 204 comprising a plurality of executable modules 206–210 that are executable on the processor 200. A first executable module 206 is for detecting a change in condition of an electronic certificate 154. The electronic certificate 154 may have been uploaded by a creator 20 of the electronic certificate 154 for use by users 30 of the electronic certificate 154. The change in the electronic certificate 154 may be effectuated by the owner of the electronic certificate 20, or a third party system wherein a change signal 10 is provided for ordering the change in the electronic certificate 154. Alternatively, the change in the electronic certificate may be due to something internal in the electronic certificate 154 itself, such as an expiration date causing the electronic certificate 154 to expire. A second executable module 208 in the computer program 204 is for notifying a user 30 of the electronic certificate 154 of the change in condition.

The user of the electronic certificate 154 may comprise a certificate user 30. The certificate user 30 may also comprise one or more of a plurality of users in a company who are notified when any electronic certificate 154 in the company's domain is revoked or changed. Some or all of the users in the company may not even have received, or known of, the electronic certificate 154 until notice of the change is provided.

The computer program 204 may comprise a third module 210 for negotiating a contract, called a certificate action point (CAP), with the certificate user 30. The contract may regard the type of change the second module 208 notifies the certificate user 30 of, the way the second module 208 notifies the certificate user 30, the diligence with which the second module 208 notifies the certificate user 30 of the change in condition, and a price for notifying the certificate user 30. Examples of diligence include: notify weekly by electronic mail, notify daily by electronic mail until response is received from certificate user 30, notify every five minutes until a response is received from certificate user 30, or notify by all possible means until response is received. The change in condition may comprise an expiration of the electronic certificate 154.

There are at least two types of changes in condition in an electronic certificate 154 that can be detected by module 206. The first type of change involves a change in content of the electronic certificate 154, up to and including the replacement of the entire electronic certificate 154 with a new electronic certificate (154a explained below) and key pair that is to be used instead, a change which is commonly called "roll-over". For PGP type electronic certificates 154, revocation also falls into this category, because the revocation information is stored with the electronic certificate 154. Other changes in content include, but are not limited to, changes to fields of the electronic certificate 154, e.g. change of address, change of title, change of permitted usage of the certificate, etc.

The second type of change in condition comprises an event, perhaps time-based, such as expiration, that does not involve any actual change to the content of the certificate, but is certainly a change in condition (e.g., now expired). For X.509 electronic certificates 154, revocation also fits into this category, because the revocation information is not stored along with the electronic certificate 154, but in a second list called a certificate revocation list, or CRL. Another change in condition is disablement, or declaring the electronic certificate 154 and its key pair to no longer be in active use, which PGP implements by changing the content of the electronic certificate 154. However X.509 could implement this in an event-based manner, similar to revocation.

To summarize the types of changes that may occur, the following is a list of possible changes in condition that may occur, but which is not meant to be a limiting list:

revocation,
roll-over (change of public key),
changes to fields of certificate,
expiration, and
disablement.

Detection of change in condition of an electronic certificate 154 can be accomplished by module 206 in many different ways. For time-based events, such as expiration, a time-based process can be used that wakes up when the event occurs, and then starts the notification process. For asynchronous events, such as the appearance of a revoked electronic certificate 154 on a CRL, a process in module 206 wakes up on each update to the CRL and checks for addition of revoked electronic certificates that had associated CAPs for detecting revocation, or the process checks CRLs periodically according to some time schedule. For change in content of an electronic certificate 154, the detection mechanism may be notified by the certificate server 100 each time a change or replacement was made to an electronic certificate 154, and determine if the change was pertinent to a CAP. Of course, such a detection mechanism need not be notified of every change to every electronic certificate 152, but could be limited by being attached only to those electronic certificates 154 that had associated CAPs.

The certificate server 100 typically stores a plurality of electronic certificates 152. The electronic certificate 154 for which the processor 200 detects a change in condition comprises at least one of the plurality of electronic certificates 152. The plurality of certificates 152 may be stored on the certificate server 100 in an ITU X.500 certificate directory, or the certificate server 100 may further comprise a certificate authority or PGP key server. The first module 206 may detect a change in condition of two or more electronic certificates 152, and the second module is for notifying one or more respective certificate users 30 of the change in condition of the respective electronic certificate 154 based on the contract, or CAP, negotiated by the third module 210. Each of the certificate users 30 negotiates a CAP for notification. Each CAP may apply to one or more of the.

The certificate server 100 typically stores a plurality of electronic certificates 152. The electronic certificate 154 for which the processor 200 detects a change in condition comprises at least one of the plurality of electronic certificates 152. The plurality of certificates 152 may stored on the certificate server 100 in an ITU X.500 certificate directory, or the certificate server 100 may further comprise a certificate authority or PGP key server. The first module 206 may detect a change in condition of two or more electronic certificates 152, and the second module is for notifying one or more respective certificate users 30 of the change in condition of the respective electronic certificate 154 based on the contract, or CAP, negotiated by the third module 210. Each of the certificate users 30 negotiates a CAP for notification. Each CAP may apply to one or more of the electronic certificates 152.

Figure 2:
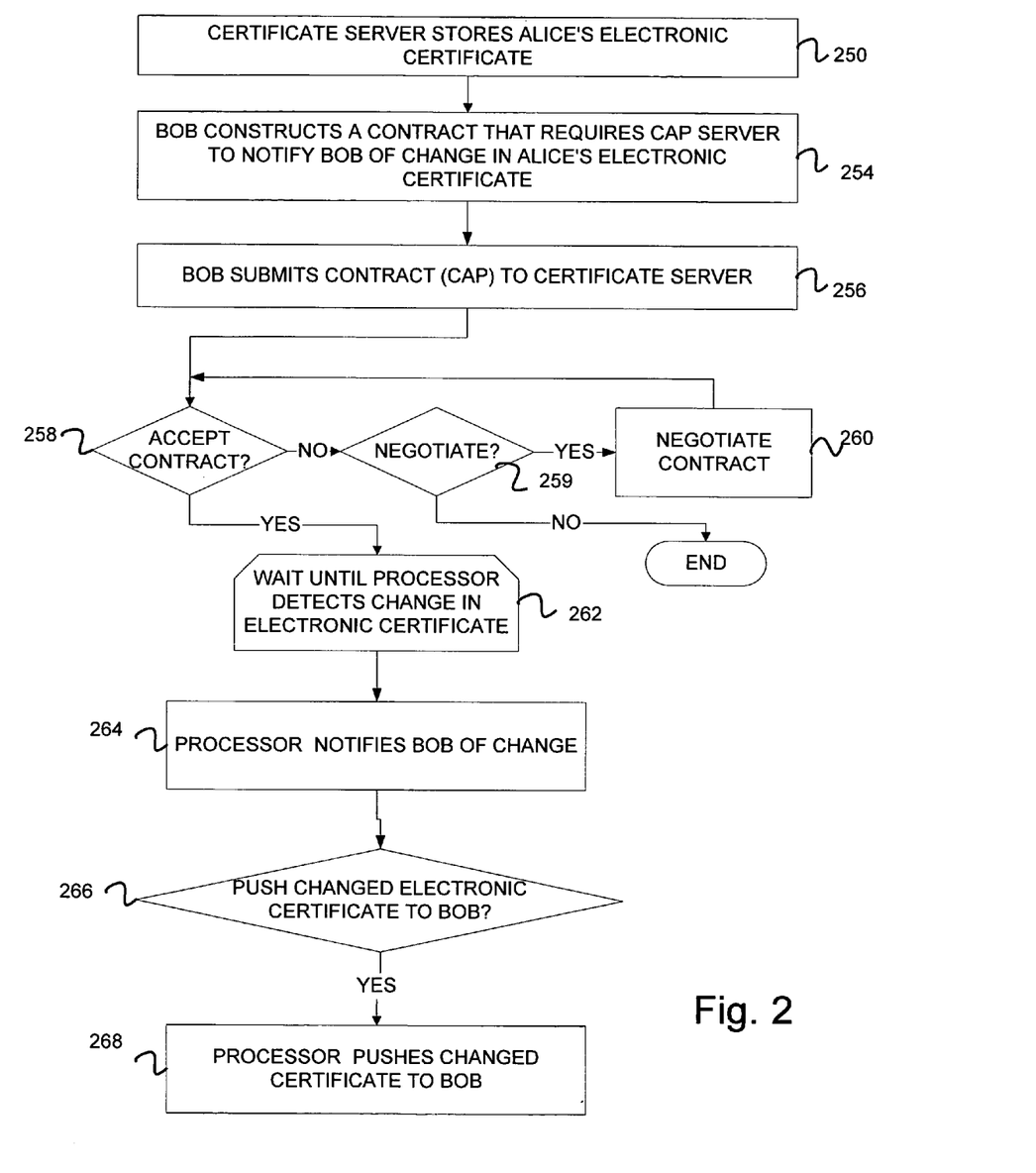
FIG. 2 is a flow diagram illustrating a method performed by the system of FIG. 1 or FIG. 4.

With reference to FIG. 2, a flow diagram illustrating a method practiced by the system of FIG. 1 is shown. In FIGS. 1–2, two hypothetical users of the system nicknamed Alice and Bob are used to illustrate the method. The certificate server 100 stores Alice's electronic certificate 154, step 250. Alice 20, the owner of an electronic certificate 154' may decide to provide the electronic certificate 154 to the certificate server 100, and to a user 30 of the electronic certificate 154, in this case Bob. Submission of the electronic certificate 154 may be made by other means other than from Alice 20. For example, a company's certificate authority may issue Alice's electronic certificate 154. Alternatively, Alice 20 may transmit a certificate request to the certificate server 100 resulting in the creation of an electronic certificate 154 for Alice 20 that can be downloaded by Bob 30. Further, the electronic certificate 154 may be distributed to Bob on machine readable magnetic media such as floppy disk, or on a machine readable optical media such as a CD ROM device. Alice 20 and Bob 30 in this illustration are symbolic persons. Electrical communications may be accomplished through a local area network, wide area network, Intranet, Internet or other type of network or communications line recognized by those skilled in the art.

The certificate server 100 may sign, or authenticate, Alice's electronic certificate 154, in which case, the newly signed electronic certificate 154 is stored on the certificate server 100 for distribution to all users 30 of the electronic certificate 154. The signing process may comprise the certificate server 100 executing various authentication procedures to make sure that Alice 20 is the one who submitted the electronic certificate 154. In some cases, for high security applications, a person representing the certificate server 100 may call Alice by telephone to verify the electronic certificate 154. Once the verification criteria are satisfied, Alice's electronic certificate 154 is added to the directory of electronic certificates 152.

After receiving, or before downloading, the electronic certificate 154, Bob 30 may construct a contract, or CAP, with the certificate server 100 using module 210, step 254.

The CAP is for notification of changes in the electronic certificate 154. Contract construction is explained with reference to FIG. 3 below. Bob 30 submits the contract to the certificate server 100, step 256. Using module 210, the processor 200 determines whether the contract submitted by Bob 30 is acceptable, step 258. There may be many reasons why the contract submitted by Bob 30 would not be acceptable, including without limitation: price paid by Bob 30 for the notification service, capability of processor 200 to carry out terms of contract (e.g. the frequency of notification asked for by Bob 30 may be to high for processing by the processor 200), the diligence with which Bob 30 would like to be notified of the change (e.g. the number of times contact is attempted with Bob 30), or the type of change in the electronic certificate 154 that Bob 30 would like detected. Another reason for not accepting the contract is that Bob 30 may not be authorized to make such a contract because Alice 20 may have requested that only certain users may receive notification. If the contract is not accepted, then module 210 may present a means for asking Bob 30 if he would like to negotiate, step 259, such as a yes-no box. If Bob 30 chooses to, he may continue to negotiate the contract with module 210, step 260.

If the contract is accepted, module 206 executes a wait statement, according to the terms of the contract with Bob 30, until a change in the electronic certificate 154 is detected, step 262. Once the change is detected, the module 208 notifies Bob 30 of the change, step 264. Notification may be by electronic mail, voice phone, cell phone message, paging, or other method known to those skilled in the art for forwarding a message to a recipient. The diligence negotiated with Bob 30 for notification is carried out by module 208. For example, if notification is by electronic mail, the contract with Bob 30 may call for attempted notification until Bob 30 responds by return electronic mail message, or reply. If notification is by voice phone, the module 208 may be required by contract to call until Bob's voice is detected answering the phone.

The change detected by module 206 in the electronic certificate 154 may comprise the reception by the certificate server 100 of an updated electronic certificate 154a that is stored in a directory with the plurality of electronic certificates 152 on the certificate server 100. Module 208 may check the CAP for whether an updated electronic certificate 154a, if any, should be pushed to Bob 30, step 266. If the contract so calls for a push of the updated electronic certificate 154a, then the updated electronic certificate 154a may be forwarded by electronic mail to Bob 30, step 268. As those skilled in the art would recognize, forwarding of the electronic certificate may be accomplished by other means such as by automated updating directly to Bob's workstation, or by providing a CD ROM of changed certificates to Bob, or by sending a floppy disk of the updated electronic certificate 154a to Bob 30. Preferably, the same method for delivery of the updated electronic certificate 154a should be used for notification of the change in the electronic certificate 154. The notification would preferably be provided at the same time, and in the same way, as the provision of the updated electronic certificate 154a to Bob 30, for example, within the same electronic mail transmission. This way, Bob 30 may immediate store the updated electronic certificate 154a in local storage for use.

Figure 3:
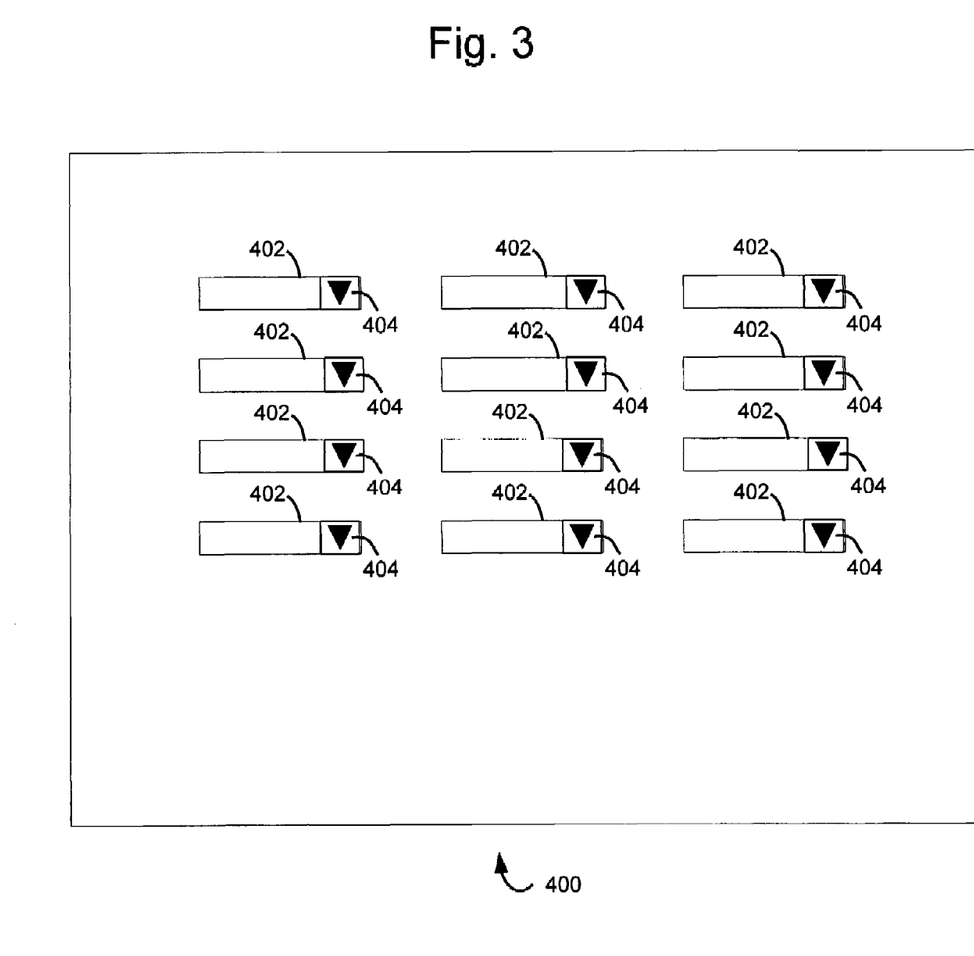
FIG. 3 is a block diagram of an exemplary screen used in negotiating a contract using a module of the system of FIG. 1 or FIG. 4.

With reference to FIG. 3, an exemplary screen used in negotiating a contract using module 210 is shown. A screen 400 may comprise a hypertext markup language (HTML) coded display for presenting in a browser window on the workstation 30 of the user (shown as Bob 30 in FIG. 1) of the electronic certificate 154. The screen 400 comprises a plurality of fields 402 used for the contract negotiation process. Each field 402 may use a drop down selection list button 404 for selection to choose items from a selection list of contract terms, each contract term defining the notification service offered to the user 30 of the electronic certificate. For example, one field may be used for selecting the frequency that the user 30 is notified of a change in the electronic certificate 154. The selection list for this contract term may comprise selections for every month, every week, every day, or every minute. If the user 30 was to choose every day, the contract would direct module 206 to check for changes in the relevant electronic certificate 154 once a day. Other terms selected by fields 402 may include the price offered by Bob 30 for the notification service, the diligence with which the user 30 would like to be notified of the change (e.g. the number of times contact is attempted with the user 30), or the type of change in the electronic certificate 154 that user 30 would like detected. Each of these selections using fields 402 are stored in a database on the certificate server 100. Modules 206 and 208 read the selection from the database with each cycle of execution loops in their executable code, such that the modules may perform based on the selections of the user 30.

Module 210 may not accept the selections from the user 30. Acceptance, or non acceptance may be based on tables of price to services offered, or acceptance may be delayed for time for a system administrator for the processor 200 to view the contract terms selected by the user 30. If the contract is not accepted, then the user 30 may be notified in real time on screen with a message and an audible tone, or by electronic mail, or other means such as by voice or paging. If the contract is not accepted, negotiations may take place wherein the user 30 is invited back to screen 400 for further modifications of the terms using fields 402.

Finally, like other contracts, the contract that is negotiated by the user 30 may have an expiration date, just as electronic certificates 152 so have. The expiration date may be one of the terms selected using one of the fields 402. The user 30 may be notified in advance before expiration of their contract so that re-negotiations may begin.

Those skilled in the art would recognize that the system may be configured in many different configurations other than that described above. For example, with reference to FIG. 4, an alternative embodiment of the system of FIG. 1 is shown. The electronic certificate 154 may be stored separately from the computer program 204. For example, the electronic certificate 154 may be stored on a first server 150 in a directory stored on the first server 150, the first server being a certificate server 150, and the processor 200 on which the computer program 204 and at least some of its executable modules are stored and executed comprises a second server 200, or certificate action point server (CAP server). However, preferably, the CAP server 200 is co-resident with the certificate server 150 as describe with respect to FIG. 1 above, meaning that the CAP server 200 comprises the same server 100, or server cluster 100, as the certificate server 150.

Figure 4:
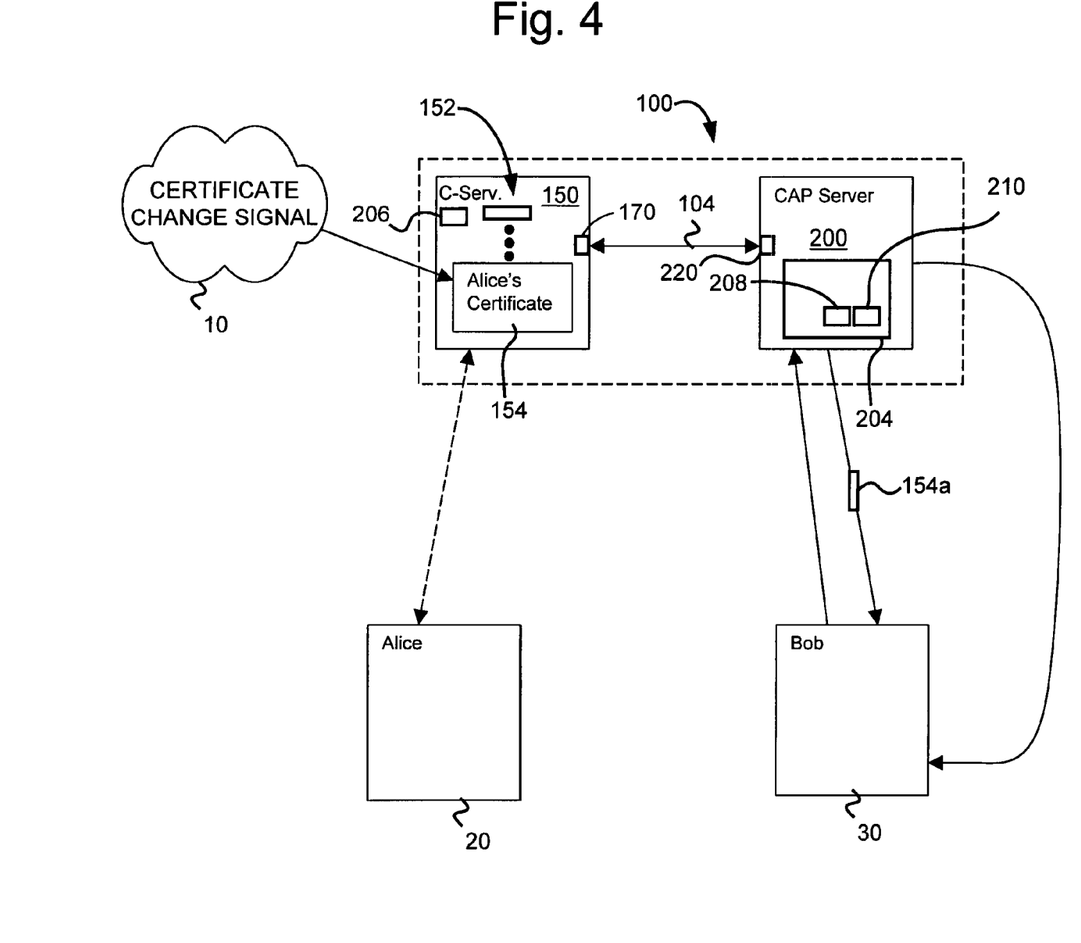
FIG. 4 is a block diagram illustrating an alternative system architecture for present invention.

If the certificate server 150 and CAP server are not co-resident, a communication channel 104 between them connects the certificate server 150 to the CAP server 200 such that data communications may occur between them. However, at least the first module 206 is preferably co-resident on the certificate server 150 as described above with respect to FIG. 1. The electrical connection 104 may comprise a network, wherein said first and second servers 150–200 each have a network interface 170, 220 for data communications in said network 104. Each of the network interfaces 170, 220 may comprise a local or wide area network connection comprising an Ethernet compatible interface or Internet connection respectively.

It will thus be seen that changes may be made in carrying out the above system and method and in the construction set forth without departing from the spirit and scope of the invention, it is intended that any and all matter contained in the above description and shown in the accompanying drawings shall be interpreted as illustrative and not in a limiting sense.

We claim:

1. In a system adapted for monitoring for changes in condition of one or more electronic certificates, and adapted for communication with a user of the one or more electronic certificates, a method for notification of a change in condition of an electronic certificate, comprising:
   detecting a change in condition of the electronic certificate;
   notifying the user of the electronic certificate of the change in condition;
   allowing the user to download an updated version of the electronic certificate;
   forwarding an updated electronic certificate to the user concurrently with the step of notifying, thereby updating the electronic certificate;
   notifying the user by electronic mail;
   notifying the user by telephone using an electronic voice messaging system;
   notifying the user by providing a paging signal to a pager for the recipient;
   negotiating a contract with the user;
   wherein the change in condition detected in the detecting step consists of a change in condition including: revocation of, roll-over of, change in field of, disablement of, and expiration of the electronic certificate;
   wherein a graphical user interface is utilized to allow the user to negotiate electronic certificate monitoring service contract terms, the graphical user interface including a plurality of drop down menus each associated with one of the terms for allowing the user to select among a plurality of choices relating to the associated terms the terms including:
      the frequency in which the user is notified, including every month, every week, every day, and every minute,
      the type of change the user is notified of in the step of notifying, including the revocation of, the roll-over of, the change in field of, the disablement of, and the expiration of the electronic certificate,
      the way of notifying the user, including the electronic mail, the telephone using the electronic voice messaging system, and the paging signal to the pager for the recipient, the diligence with which the user is notified of the change in condition, including a number of times contact is attempted with the user, and a price for notifying the user.

* * * * *